United States Patent
Das et al.

(10) Patent No.: US 8,214,640 B2
(45) Date of Patent: Jul. 3, 2012

(54) METHOD OF EMBEDDING INFORMATION IN IMPLEMENTATION DEFINED SIP HEADER FIELDS

(75) Inventors: Kamala Prasad Das, Manalapan, NJ (US); Ajay Sathyanath, Woodbridge, NJ (US)

(73) Assignee: Alcatel Lucent, Paris (FR)

(*) Notice: Subject to any disclaimer, the term of this patent is extended or adjusted under 35 U.S.C. 154(b) by 1291 days.

(21) Appl. No.: 11/294,731

(22) Filed: Dec. 5, 2005

(65) Prior Publication Data

US 2007/0130475 A1 Jun. 7, 2007

(51) Int. Cl.
*H04L 29/06* (2006.01)
(52) U.S. Cl. .......................... 713/160; 713/153
(58) Field of Classification Search .................. None
See application file for complete search history.

(56) References Cited

U.S. PATENT DOCUMENTS

| | | | |
|---|---|---|---|
| 2002/0129236 A1* | 9/2002 | Nuutinen | 713/151 |
| 2003/0012170 A1 | 1/2003 | Vassilovski et al. | 370/342 |
| 2003/0043992 A1 | 3/2003 | Wengrovitz | 379/229 |
| 2003/0217165 A1* | 11/2003 | Buch et al. | 709/229 |
| 2004/0111478 A1 | 6/2004 | Gross et al. | 709/206 |
| 2005/0220095 A1* | 10/2005 | Narayanan et al. | 370/389 |

FOREIGN PATENT DOCUMENTS

WO PCT/US2006/046324 8/2007

* cited by examiner

*Primary Examiner* — Nasser Goodarzi
*Assistant Examiner* — Trong Nguyen
(74) *Attorney, Agent, or Firm* — Wolff & Samson P.C.

(57) ABSTRACT

A method is provided for passing control messages and other information through a SIP network by embedding the information in SIP messages. The information is sent from one SIP agent to another by encrypting the information, embedding the encrypted information in one or more implementation-defined SIP header fields, and transmitting a SIP message that includes the field or fields in which the information is embedded.

8 Claims, 1 Drawing Sheet

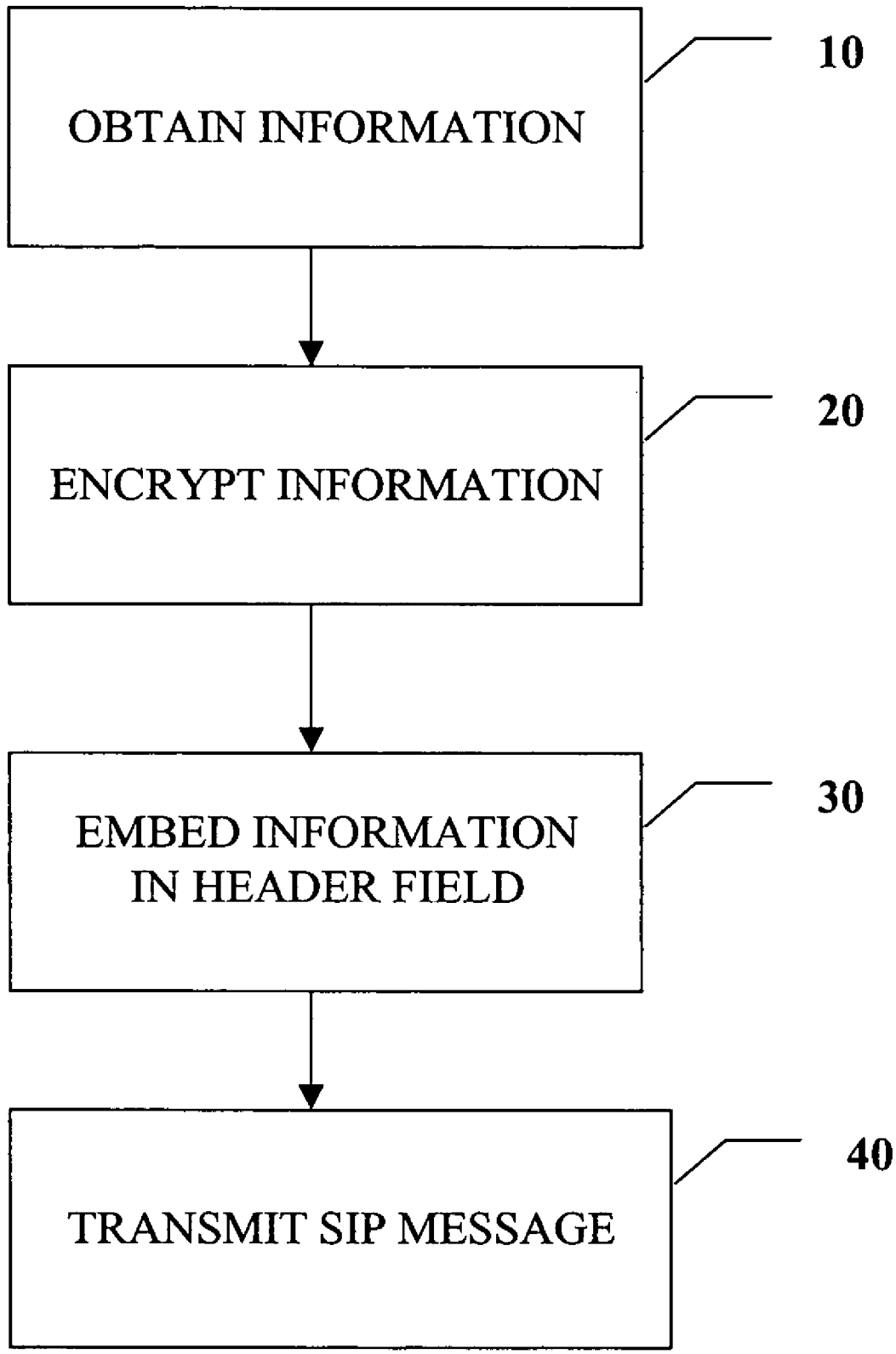

METHOD OF EMBEDDING INFORMATION IN IMPLEMENTATION DEFINED SIP HEADER FIELDS

FIELD OF THE INVENTION

This invention relates to methods of sending information over the Internet, and more particularly to transmission methods which conform to the SIP protocol.

ART BACKGROUND

SIP (Session Initiation Protocol) is an application-layer control (signaling) protocol which cooperates with other protocols to facilitate communication between Internet endpoints, which in this context are also referred to as "user agents". More specifically, SIP can establish, modify, and terminate Internet telephony calls and other multimedia sessions. SIP provides support of this type by, among other things, locating the end point for a communication, ascertaining whether the called party is available, determining the media to be used and the corresponding media parameters, and setting up and managing the session. A thorough description of SIP may be found in J. Rosenberg et al., RFC 3261, The Internet Society (2002) (www.faqs.org/rfcs/rfc3261.html).

The logical entities that implement rules defined by the SIP protocol are referred to as "SIP elements" or "SIP agents". SIP elements include user agent (UA) clients, UA servers, stateless proxies, stateful proxies, and registrars. Data sent between the SIP agents as part of the SIP protocol are referred to as "SIP messages". A SIP message is either a request or a response.

A SIP message includes a header, and may also include a message body. The header is constructed as a sequence of one or more header fields which contain information about the message. A typical header field is populated by a header field name, and may also include a list of one or more header field values.

If the SIP message includes a message body, the pertinent header fields will specify the Internet media type and length of the message body, and whether it has undergone any compression or other encoding.

For a variety of reasons, it would be desirable to be able to send control messages and other data between specific agents in the SIP network without processing, or even without detection, of those messages by intermediary SIP agents. For example, a SIP agent may drop a header from a message passing through it if the agent fails to recognize the header. However, new SIP features and new extensions to SIP will generally require new headers. Even if the new headers can be processed by the agents at the pertinent endpoints of the network, there may be a danger of losing header information in transit unless the entire network has been overhauled. Thus, it would promote the early introduction of new SIP features, before operators invest in network overhaul, if the new headers could be embedded so as to evade processing by intermediary agents.

Other uses for such embedded information might include peer-to-peer communication between specified SIP proxies or agents of transactional or billing information, recording of signaling information for specific sessions between agents for subsequent processing, or communication of information for monitoring network operations, while excluding other proxies and agents from access to the information.

SUMMARY OF THE INVENTION

We have devised such a method for embedding information in SIP messages. In one aspect, our new method involves sending information from one SIP agent to another by encrypting the information, embedding the encrypted information in one or more SIP header fields, and transmitting a SIP message that includes the field or fields in which the information is embedded. Specifically, the header fields to be used for this purpose are those whose values are material to the working of the SIP protocol only insofar as they are unique and can be used to ascertain dialog-id, call-id, or other identifying information. Such a property leaves room for us to use these fields to insert unique information and then use that information as the call-id, dialog-id, or the like. Such fields are referred to here as "implementation-defined". The term "implementation-defined" will have that meaning throughout the discussion below.

In a second aspect, our invention involves a SIP agent receiving such embedded information from another SIP agent by receiving a SIP message that includes SIP header fields, at least one of which is implementation-defined, extracting embedded information from one or more of the implementation-defined SIP header fields, and decrypting the extracted information.

BRIEF DESCRIPTION OF THE DRAWING

FIG. 1 is a flowchart showing a sequence of steps in the transmission of information according to the method described herein.

DETAILED DESCRIPTION

Of the various types of SIP messages that might be used for the embedding of information, it is advantageous to use SIP messages of the most basic types. That will assure that the information can be transported in standard SIP messages, which are relatively plentiful, and are compatible with any SIP agent with which the message might have contact. Basic SIP messages include, for example, the request messages REGISTER, INVITE, ACK, CANCEL, BYE, and OPTIONS, and their responses.

We have identified four header fields which occur in basic SIP messages, and which include implementation-defined parameters, which are examples of header fields useful for the method to be described here.

The header fields we have identified are Via, From, To, and Call-ID.

The "Via" header field includes an address to which responses to a request message are to be sent, and also includes a "branch" parameter for the client and server to use to identify the transaction which the message creates. The branch parameter is implementation-defined, but it must be prefixed by the string "z9hG4bK".

The "From" header field includes a URI (Uniform Resource Identifier) to identify the initiator of a request message. The "From" header field also includes a "tag" parameter, typically a random string selected by the UAC. (A UAC—User Agent Client—is the logical entity that creates the new request and sends it using the client transaction state machinery.) The tag is used for identification purposes. For example, a "dialog," i.e., a peer-to-peer SIP relationship, is uniquely identified by the combination of a "To" tag, a "From" tag, and the value of the "Call-ID" field. The "From" tag parameter is implementation-defined.

The "To" header field includes a URI to identify the user or resource that is the target of the request message. A "tag" parameter may be included if the request relates to a dialog.

The "Call-ID" header field provides a unique string for identifying a grouped series of messages. For example, all requests and responses sent by the user agents in a dialog share the same Call-ID. The Call-ID header is implementation-defined. Typically, this field is populated with a cryptographically random string. However, the precise string used is arbitrary, provided only that it can serve its identification function.

In accordance with our method, information is embedded in implementation-defined header fields, such as those described above. With reference to FIG. 1, the information to be embedded is obtained (block 10) and encrypted (block 20) using, for example, a public key K1. The result of the encryption is used to populate (block 30) one or more implementation-defined header fields of a SIP message. As populated into a header field, the encrypted information may, for example, serve as an identifier as if it were a random string. A SIP message, including the header or headers bearing embedded information, is transmitted (block 40) from the originating SIP agent to the target SIP agent. In transit, the encrypted information will be treated in accordance with the SIP protocol, for example as a random identification string, and normally, it will not be read for any information content.

However, the SIP agent at the destination end point, or one or more intermediary SIP agents on the route between the end points, may be instructed to store certain headers for further processing, in order to recover embedded information therefrom.

As noted above, the "branch" parameter must be prefaced with the string "z9hG4bK". Therefore, if encrypted information is to be populated into the branch parameter field, it will have to be prepended by this string, in unencrypted form.

It will be advantageous to prepend encrypted information (as embedded in any appropriate field) with a pattern, herein denominated an "initial search string", which indicates the presence of information to be recovered. The use of such a string can prevent wasteful attempts to decode header fields that do not, in fact, contain embedded information.

Any of various known methods may be used for exchanging the public key K1 and the initial search string. These include, among others, secure phone calls and secure email transmissions.

The utility of the initial search string can be enhanced by designing it to be an index to the format of the data to which it is prepended. Although in principle there is no restriction on the format of the initial search string (other than those that might be imposed by the SIP protocol on the header fields that are affected), it will as a practical matter often be advantageous to use a string at least four characters in length.

Below, we will provide examples of three possible formats for encrypted information, which we denominate S1, S2, and S3, respectively. We also describe a possible format for the initial search strings, which we respectively denominate Pattern1, Pattern2, and Pattern3. The initial search strings are user defined, and are determined prior to the communication to which they pertain.

The three exemplary formats are summarized in the table below:

| INITIAL-SEARCH STRING | TYPE | STRUCTURE |
|---|---|---|
| Pattern1 | Parameter-value pairs | S1 |
| Pattern2 | Command | S2 |
| Pattern3 | Messages | S3 |

The type of format that we denominate "parameter-value pairs" is used to pass values for user-defined parameters. The corresponding structure S1 is of the type represented by the following table:

| Initial character | Parameter:value, parameter:value . . . |
|---|---|

If the initial character is "A", for example, this format may be used to send advertisements. When one SIP agent requires information from another, the initial character may, e.g., be "R" for "request". When one SIP agent is replying to another, the initial character may be "P" for "reply".

The field following the initial character contains a sequence of parameter-value pairs separated by commas.

The type of format that we denominate "Command" is used to send a command, which may take one or more arguments. The corresponding structure S2 is of the type represented by the following table:

| Initial character | Command, arg1, arg2 . . . argn |
|---|---|

The initial character may, for example, take the value "C" to indicate that the data that follow it represent a command. The field following the initial character contains the name of the command, followed, if pertinent, by a list of arguments arg1, arg2, etc., separated by commas.

The type of format that we denominate "Messages" is used to send a message or a string of an arbitrary type. The corresponding structure S3 is of the type represented by the following table:

| Initial character | string or message |
|---|---|

The initial character may, for example, take the value "M" to denote "message". The field following the initial character contains the message or string to be sent.

One header may be used to contain all of the embedded information, or the information may be embedded across a multiplicity of headers. However, if the information is spread across multiple Via headers, for example, the SIP agent which is designated to receive the embedded information must strip and process the multiplicity of Via headers, and not just a single Via header. This implies that of the Via headers that contain embedded information, all but one are dummy headers that a SIP agent will process and remove from the SIP message in either direction.

The dummy Via headers may include dummy domain names, provided the non-dummy Via header belonging to the pertinent SIP agent is on top, and the pertinent SIP agent knows how to process the dummy headers. The destination SIP agent that has been targeted to receive the embedded information should also know how to process and strip the dummy Via headers.

Embedded information in the "To", "From", and "Call-Id" headers cannot be spread across multiple headers of those respective types, because multiplicities of headers of those types would cause the SIP protocol to fail.

In the "To" and "From" headers, information is embedded by inserting it in the "Tag" field. That is, these headers include a string of the form "tag=value". The embedded information is inserted in the place denominated as "value".

The "Call-Id" field contains a string of the form "abcd@domain.com". Information can be embedded in this field by inserting it before the "@" sign; that is, by inserting it in the place denominated as "abcd".

On receipt by the SIP agent which is the targeted recipient for the embedded information, the headers are stored for subsequent processing. The subsequent processing includes, for example, selecting those header fields that have initial search strings, and decrypting them to recover the embedded information.

The invention claimed is:

1. A method for sending selected information from one Session Initiation Protocol (SIP) end-point agent to another SIP end-point agent, the method comprising:
    selecting the information to be sent;
    encrypting the information by a processor;
    selecting one or more header fields of an SIP message to be sent from the SIP end-point agent, the selected header fields each having a first portion defined according to the SIP protocol as representing a transactional characteristic of the header field and a second portion representing identification information specific to the SIP message;
    embedding, by a processor, the encrypted information in the second portion of the one or more selected SIP header fields;
    prepending, by a processor, the encrypted information with a user-defined initial search string previously exchanged between the SIP end-point agents, wherein the user-defined initial search string indicates the presence of the encrypted information to be recovered from the second portion of the one or more selected SIP header fields, and wherein an initial character of the user-defined initial search string indexes a parameter-value pair format, command format or message format of the encrypted information to which the user-defined initial search string is prepended; and
    transmitting the SIP message that includes said selected field or fields, wherein the encrypted information embedded in the second portion of the one or more selected fields will not be read for information content by intermediate SIP agents in the transmission path between the SIP end-point agents.

2. The method of claim 1, wherein the user-defined initial search string is determined prior to a communication of the selected information to which the user-defined initial search string pertains.

3. The method of claim 1, wherein the user-defined initial search string comprises a value which indicates that data following it represents one of command, message, advertisement, request or reply data.

4. A method for at least one Session Initiation Protocol (SIP) end-point agent to receive information from another SIP end-point agent, wherein the information is selected and encrypted at the another SIP end-point agent for transmission to the at least one SIP end-point agent, the method comprising:
    receiving, at a receiver of the at least one SIP end-point agent, an SIP message that includes SIP header fields, at least one of which is characterized by having a first portion defined according to the SIP protocol as representing a transactional characteristic of the header fields and a second portion representing identification information specific to the SIP message, and wherein the encrypted information is embedded in the second portion of the header field by the another SIP end-point agent;
    extracting, by a processor of the at least one SIP end-point agent, embedded information from one or more of said second portion of said SIP header fields based on a user-defined initial search string previously exchanged between the SIP end-point agents, wherein the user-defined initial search string indicates the presence of the encrypted information to be recovered from the second portion of the one or more selected SIP header fields, and wherein an initial character of the user-defined initial search string indexes a parameter-value pair format, command format or message format of the encrypted information to which the user-defined initial search string is prepended; and
    decrypting, by the at least one SIP end-point agent, the extracted information, wherein the encrypted information embedded in the second portion of the one or more header fields is not read for information content by intermediate SIP agents in the transmission path between the SIP end-point agents.

5. A Session Initiation Protocol (SIP) end-point agent comprising:
    a processor configured to:
        select the information to be sent to another SIP end-point agent;
        encrypt the information;
        select one or more header fields of an SIP message to be sent from the SIP end-point agent, the selected header fields each having a first portion defined according to the SIP protocol as representing a transactional characteristic of the header field and a second portion representing identification information specific to the SIP message;
        embed the encrypted information in the second portion of the one or more selected SIP header fields;
        prepend the encrypted information with a user-defined initial search string previously exchanged between the SIP end-point agents, wherein the user-defined initial search string indicates the presence of the encrypted information to be recovered from the second portion of the one or more selected SIP header fields, and wherein an initial character of the user-defined initial search string indexes a parameter-value pair format, command format or message format of the encrypted information to which the user-defined initial search string is prepended; and
        transmit the SIP message that includes said selected field or fields, wherein the encrypted information embedded in the second portion of the one or more selected fields will not be read for information content by intermediate SIP agents in the transmission path between the SIP end-point agents.

6. The SIP end-point agent of claim 5, wherein the processor is further configured to determine the user-defined initial search string prior to a communication of the selected information to which the user-defined initial search string pertains.

7. The SIP end-point agent of claim 5, wherein the user-defined initial search string comprises a value which indicates that data following it represents one of command, message, advertisement, request or reply data.

8. A Session Initiation Protocol (SIP) end-point agent configured to receive information from another SIP end-point agent, wherein the information is selected and encrypted at the another SIP end-point agent for transmission to the SIP end-point agent, the SIP end-point agent comprising:
    a receiver configured to:
        receive an SIP message that includes SIP header fields, at least one of which is characterized by having a first portion defined according to the SIP protocol as representing a transactional characteristic of the header fields and a second portion representing identification information specific to the SIP message, and wherein the encrypted information is embedded in the second portion of the header field; and a processor configured to:

extract embedded information from one or more of said second portion of said SIP header fields based on a user-defined initial search string previously exchanged between the SIP end-point agents, wherein the user-defined initial search string indicates the presence of the encrypted information to be recovered from the second portion of the one or more selected SIP header fields, and wherein an initial character of the user-defined initial search string indexes a parameter-value pair format, command format or message format of the the encrypted information to which the user-defined initial search string is prepended; and decrypt the extracted information, wherein the encrypted information embedded in the second portion of the one or more header fields is not read for information content by intermediate SIP agents in the transmission path between the SIP end-point agents.

* * * * *